United States Patent
Harvey et al.

(10) Patent No.: US 10,614,843 B2
(45) Date of Patent: Apr. 7, 2020

(54) INPUT COUPLER WITH FEATURES TO DIVERT STRAY LIGHT FROM A WAVEGUIDE

(71) Applicant: Seagate Technology LLC, Cupertino, CA (US)

(72) Inventors: Christopher Neil Harvey, Derry (GB);
Kelly Elizabeth Callan, Derry (GB);
Aidan Dominic Goggin, Donegal (IE);
John Bernard McGurk, Derry (GB);
Reyad Mehfuz, Derry (GB);
Christopher Gerwyn Ward, Randalstown (GB)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 16/446,882

(22) Filed: Jun. 20, 2019

(65) Prior Publication Data
US 2020/0027478 A1    Jan. 23, 2020

Related U.S. Application Data

(60) Provisional application No. 62/699,217, filed on Jul. 17, 2018.

(51) Int. Cl.
*G11B 7/135*    (2012.01)
*G11B 5/48*     (2006.01)
*G11B 5/00*     (2006.01)

(52) U.S. Cl.
CPC .... *G11B 5/4866* (2013.01); *G11B 2005/0021* (2013.01)

(58) Field of Classification Search
None
See application file for complete search history.

(56) References Cited

U.S. PATENT DOCUMENTS

| 6,778,739 | B1* | 8/2004 | Jerphagnon | G02B 6/12011 |
| | | | | 385/17 |
| 8,605,556 | B1* | 12/2013 | Peng | G11B 5/314 |
| | | | | 369/13.13 |
| 8,619,363 | B1 | 12/2013 | Coleman | |
| 9,746,608 | B1* | 8/2017 | Rabiei | G02B 6/124 |
| 9,792,937 | B1* | 10/2017 | Goggin | G11B 5/314 |
| 9,875,761 | B1 | 1/2018 | Mehfuz et al. | |
| 2004/0042377 | A1* | 3/2004 | Nikolai | B82Y 20/00 |
| | | | | 369/112.09 |

(Continued)

*Primary Examiner* — Peter Vincent Agustin
(74) *Attorney, Agent, or Firm* — Mueting, Raasch & Gebhardt, P.A.

(57) ABSTRACT

A recording head has a waveguide core with an input end proximate an energy source at an input surface of the recording head. The waveguide core couples light from the energy source to a near-field transducer that heats a recording medium in response to the light. An input coupler extends along the waveguide core from the input end to a termination region that is away from the input end in a light propagation direction. The input coupler has a first refractive index between that of the waveguide core and a surrounding material. The input coupler is wider than the waveguide core and has a slanted edge at the termination region. The slanted edge crosses the waveguide core such that the input coupler narrows to a neck away from the waveguide core in a crosstrack direction.

20 Claims, 7 Drawing Sheets

(56) References Cited

U.S. PATENT DOCUMENTS

| | | | |
|---|---|---|---|
| 2007/0165495 A1 | 7/2007 | Lee et al. | |
| 2010/0307678 A1* | 12/2010 | Yokoi | G02B 6/132 156/278 |
| 2011/0158578 A1* | 6/2011 | Yokoi | G02B 6/12 385/6 |
| 2011/0205864 A1* | 8/2011 | Huang | G02B 6/102 369/13.33 |
| 2012/0113770 A1* | 5/2012 | Stipe | G11B 5/6088 369/13.33 |
| 2012/0201107 A1* | 8/2012 | Peng | G11B 5/6088 369/13.24 |
| 2016/0293189 A1* | 10/2016 | Yang | G02B 6/126 |
| 2017/0084299 A1* | 3/2017 | Peng | G02B 6/1228 |

* cited by examiner

INPUT COUPLER WITH FEATURES TO DIVERT STRAY LIGHT FROM A WAVEGUIDE

RELATED APPLICATIONS

This application claims the benefit of provisional Patent Application Ser. No. 62/699,217, filed on Jul. 17, 2018, which is incorporated herein by reference in its entirety.

SUMMARY

The present disclosure is directed to an input coupler with features to divert stray light from a waveguide. In one embodiment, a recording head has a waveguide core with an input end proximate an energy source at an input surface of the recording head. The waveguide core couples light from the energy source to a near-field transducer that heats a recording medium in response to the light. An input coupler extends along the waveguide core from the input end to a termination region that is away from the input end in a light propagation direction. The input coupler has a first refractive index between that of the waveguide core and a surrounding material. The input coupler is wider than the waveguide core and has a slanted edge at the termination region. The slanted edge crosses the waveguide core such that the input coupler narrows to a neck away from the waveguide core in a crosstrack direction.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a source of optical energy (e.g., a laser diode) is integrated with a recording head and couples optical energy to a waveguide or other light transmission path. The waveguide delivers the optical energy to a near-field transducer (NFT). The NFT concentrates the optical energy into a tiny optical spot in a recording layer, which raises the media temperature locally, reducing the writing magnetic field required for high-density recording.

The laser diode used in a HAMR recording head is an open resonator, for instance, an edge-emitting laser diode. This type of device can be de-stabilized by returning light into the diode cavity, sometimes referred to as optical feedback. Optical feedback may cause laser instability, which behaves as optical output jump and dynamic intensity noise. This can result sudden jumps and jitter in the magnetic transitions recorded to the disc. Embodiments are described below that can reduce or eliminate optical feedback.

In embodiments described below, an optical input coupler includes features that reduce back-reflected light, thereby improving in the stability of the laser during operation. The optical input coupler receives light from the light source (e.g., through a facet in a mounting surface on which the light source is attached) and directs the light towards a delivery waveguide core that couples the light to the NFT. The optical input coupler includes a rectangular block with angled front end (the 'input coupler') in order to mitigate direct back-reflections. The angled front end narrows to a tip or neck, which can open out into a larger block (the 'escape slab') in order to divert any remaining stray/uncoupled light. An optical waveguide core is placed adjacent the input coupler to receive the coupled light and deliver it to the NFT.

Figure 1:
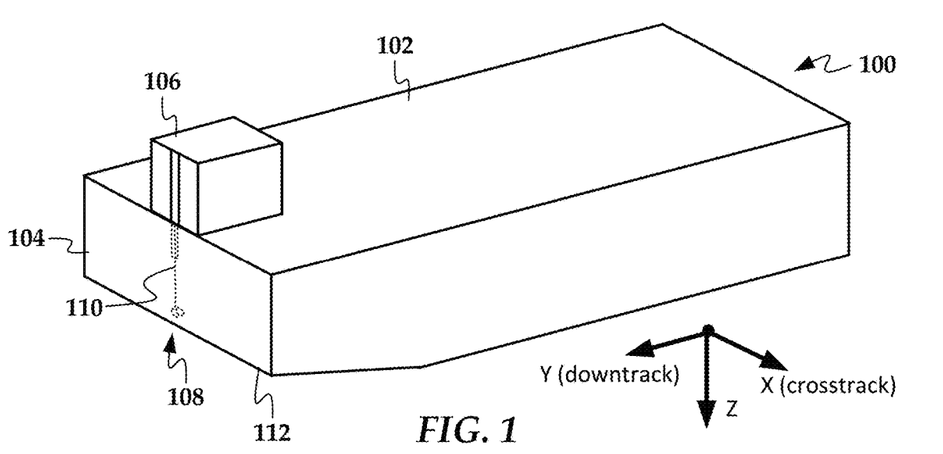
FIG. 1 is a perspective view of a slider assembly according to an example embodiment.

In reference now to FIG. 1, a perspective view shows a recording head 100 according to an example embodiment. The recording head 100 may be used in a magnetic data storage device, e.g., HAMR hard disk drive. The recording head 100 may also be referred to herein interchangeably as a slider, head, write head, read head, read/write head, etc. The recording head 100 has a slider body 102 with transducers 108 at a trailing edge 104 that are held proximate to a surface of a magnetic recording medium (not shown), e.g., a magnetic disk. The transducers 108 may include both read elements (e.g., magnetoresistive stack) and write elements (e.g., write pole, write coil, NFT).

The illustrated recording head 100 is configured as a HAMR device, and so includes components that form a hot spot on the recording medium near the transducers 108. These HAMR components include an energy source 106 (e.g., laser diode, also referred to herein as a light source) and a waveguide 110. The waveguide 110 delivers electromagnetic energy from the energy source 106 to a near-field transducer (NFT) that is part of the transducers 108. The NFT achieves surface plasmon resonance and directs the energy out of a media-facing surface 112 to create a small hot spot in the recording medium.

Figure 2:
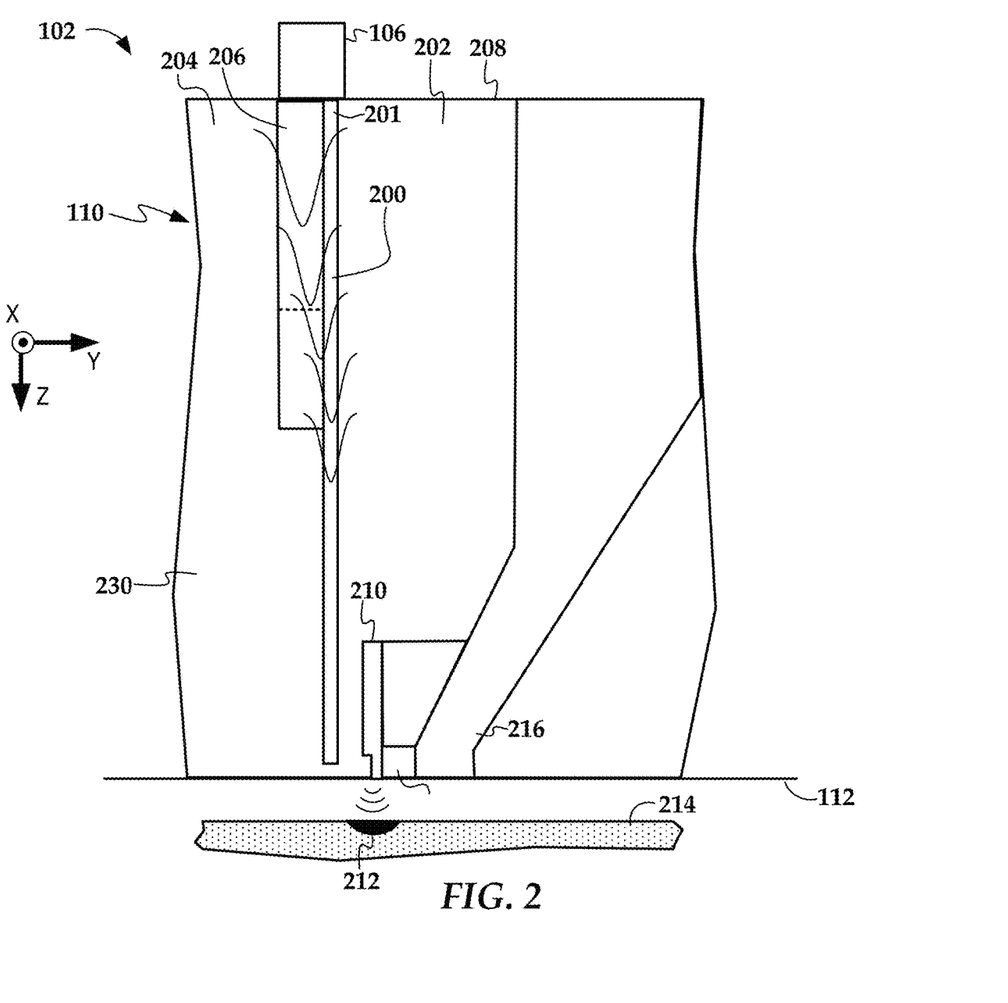
FIG. 2 is a cross-sectional view of a slider along a downtrack plane according to according to an example embodiment.
Figure 3:
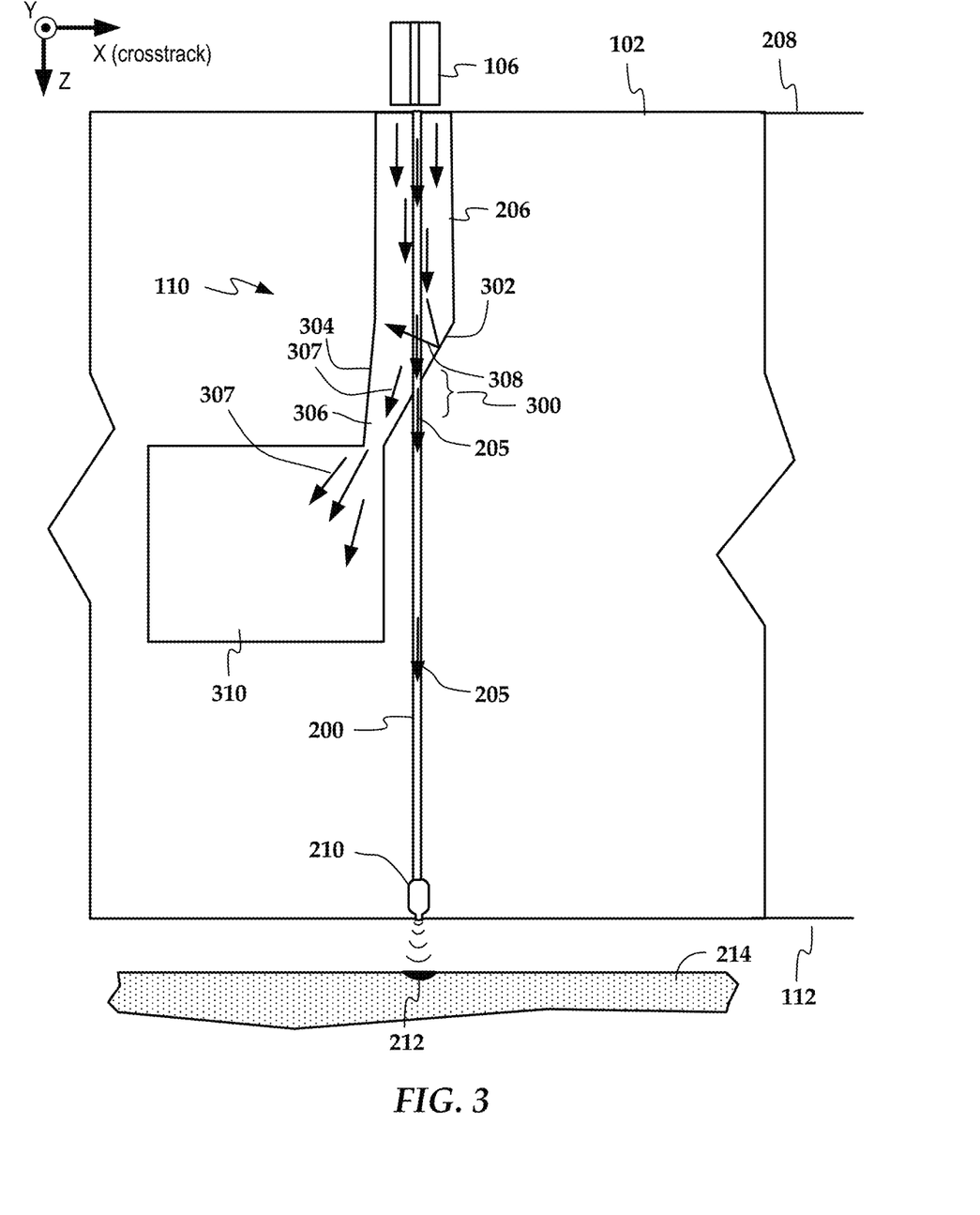
FIG. 3 is a wafer plane view of a slider according to an example embodiment.

In FIGS. 2 and 3, cross-sectional views show details of the slider body 102 according to an example embodiment. The waveguide 110 includes a core 200, top cladding layer 202, and bottom cladding layer 204. The waveguide core 200 has an input end 201 near an input surface 208 (top surface in this example) of the slider body 102. A waveguide input coupler 206 extends from the input surface 208 in a light propagation direction (z-direction) partway along the length of the waveguide core 200. The input coupler 206 receives light over a relatively large area from the light source 106 and directs the light into the waveguide core 200. The waveguide core 200 delivers and couples the light to a near-field transducer 210 at the media-facing surface 112. The near-field transducer 210 emits surface plasmons in response to the light that are directed out the media-facing surface 112 to create a hotspot 212 on a recording medium 214. A write pole 216 creates a magnetic field in response to activation of a write coil (not shown) and this magnetic field affects the magnetic orientation within the hotspot 212.

As seen in FIG. 3, the input coupler 206 is wider than the waveguide core 200 in a crosstrack direction (x-direction) The input coupler 206 overlaps the waveguide core 200 from the input surface 208 to a termination region 300. At the termination region, the input coupler 206 tapers and terminates off-center from the waveguide core in a crosstrack direction such that a slanted edge 302 of the input coupler 206 crosses the waveguide core 200. The input coupler 302 has a second slanted edge 304 that is at a shallower angle than slanted edge 302 relative to the light propagation direction such that the input coupler 206 narrows to a neck 306 away from the waveguide core 200 in a crosstrack direction. The relative angles of the slanted edges 302, 304 for the taper in the neck 306.

The input coupler 206 is formed of a material that has a refractive index between that of the waveguide core 200 and the surrounding material (e.g., the top and/or bottom cladding layers 202, 204 shown in FIG. 2, and/or a side cladding layer which is not shown in these views). This intermediate refractive index assists in guiding a first part of the light 205 into the core 200 as indicated by the arrows. Generally, the as first part of the light progresses through the input coupler 206 it becomes more confined and couples upwards into the higher index waveguide core 200. This first part of the light 205 is delivered to the near-field transducer 210 via the waveguide core 200.

A second part of the light 307 that does not couple into the waveguide core 200 is directed away from the core 200 via the neck 306. The boundary between the input coupler 206 and the surrounding material results in a sudden change in refractive index which causes reflections near the termination region 300. This change in refractive index can cause reflections of some of the second part of the light 207, as indicated by arrow 308. By tailoring the angles of the slanted edges 302, 304 and placing the neck 306 off-center from the waveguide core 200, reflections back to the energy source 106 can be reduced. Note that while the slanted edges 302, 304 are shown as linear, they may take other shapes, e.g., parabolic curves.

To further reduce reflections, the neck 306 of the input coupler 206 can be coupled to an escape slab 310 that is made of the same material as the input coupler 206. The second part of the light 307 disperses in the escape slab 310 instead of reflecting back towards the light source 106. The escape slab 310 may also absorb stray light from the surrounding cladding layers, which should further help mitigate reflections. The illustrated escape slab 310 is rectangular as projected onto the substrate-parallel plane (xz-plane), although any shape may be used for the escape slab 310.

Figure 4:
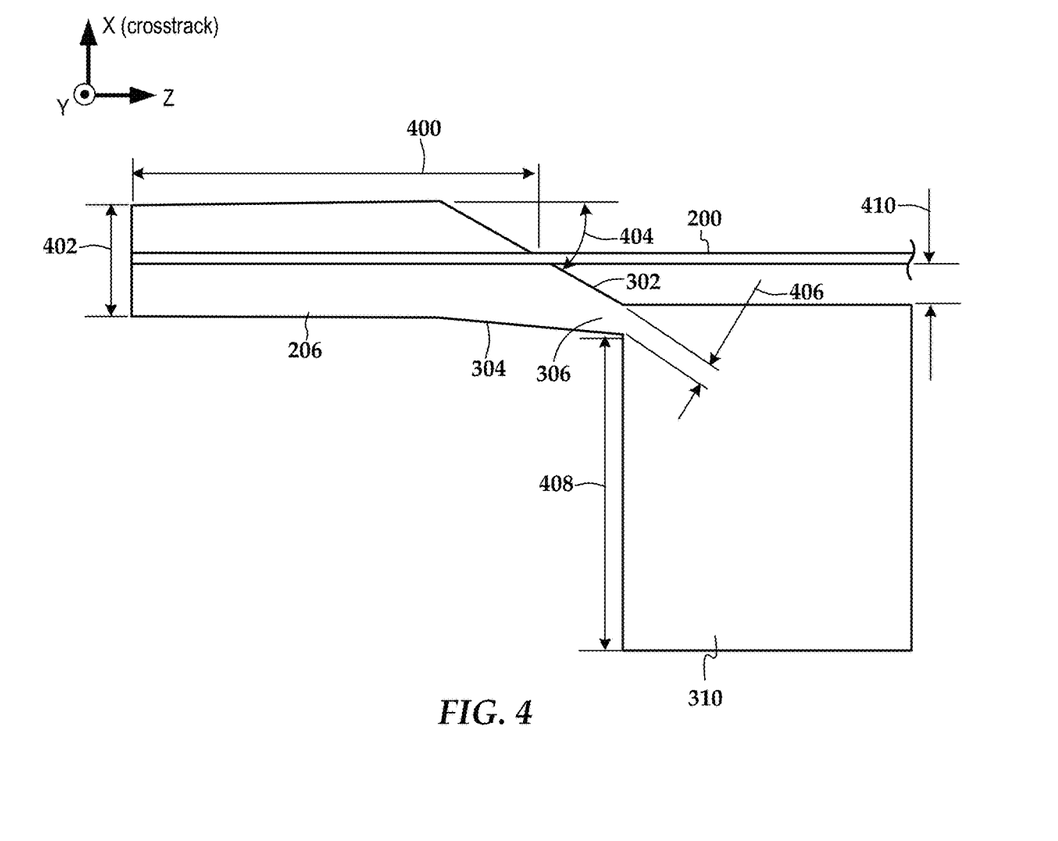
FIG. 4 is a diagram showing features of an input coupler and escape slab according to an example embodiment.

In FIG. 4, a diagram shows additional details of the waveguide system shown in FIGS. 2 and 3, including example dimensions of the input coupler 206 and escape slab 310. Note that these example dimensions are provided for illustration and not limitation, and may change based on, among other things, the wavelength of the light transmitted through the waveguide, the materials used to form the illustrated components and surrounding materials, the dimensions of the waveguide core 200, the available space within the recording head, etc. The length 400 of the input coupler 206 may be about 110 μm, and the width 402 may be about 5 μm. The thickness of the input coupler 206 (normal to the drawing page) may be about 1 μm. The angle 404 of the slanted edge 302 may be less than 15 degrees (e.g., around 5 degrees), and the width 406 of the neck 306 may be about 2 μm. The width 408 of the escape slab 310 may be around 40 μm. A crosstrack gap 410 between the escape slab 310 and the waveguide core 200 is large enough that the mode in the waveguide core 200 is not disturbed by the presence of the escape slab 310.

Figure 5:
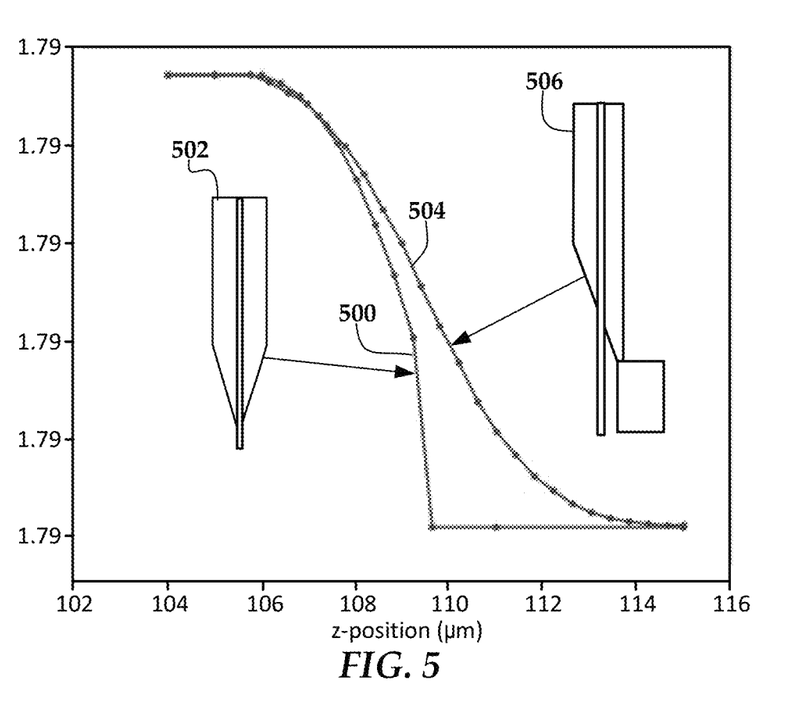
FIGS. 5, 6, and 7 are graphs showing optical performance of an input coupler and escape slab according to an example embodiment.

The illustrated input coupler 206 and escape slab 310 was analyzed to demonstrate improvements over a baseline design. In FIG. 5, a plot shows the effective index, $n_{eff}$, for light that has coupled into the waveguide, as it passes over the front boundary of the input coupler. Curve 500 corresponds to the baseline configuration 502 where an input coupler has a terminating taper that is centered over the waveguide core. The tip of the input coupler in the baseline configuration 502 crosses the waveguide at a 90 degree angle. Curve 504 corresponds to the current design 506 described herein, being configured with slanted edge of the input coupler crossing over the waveguide core at a much shallower angle than with configuration 502. For this modeling, the angle of the slanted edge relative to the waveguide core (see angle 404 in FIG. 4) was ~5 degree. As indicated by the curves, 500, 504 the index changes much more smoothly with the new configuration 506 compared to the baseline 502, resulting in a reduction in reflections coming back to into the light source.

Figure 6:
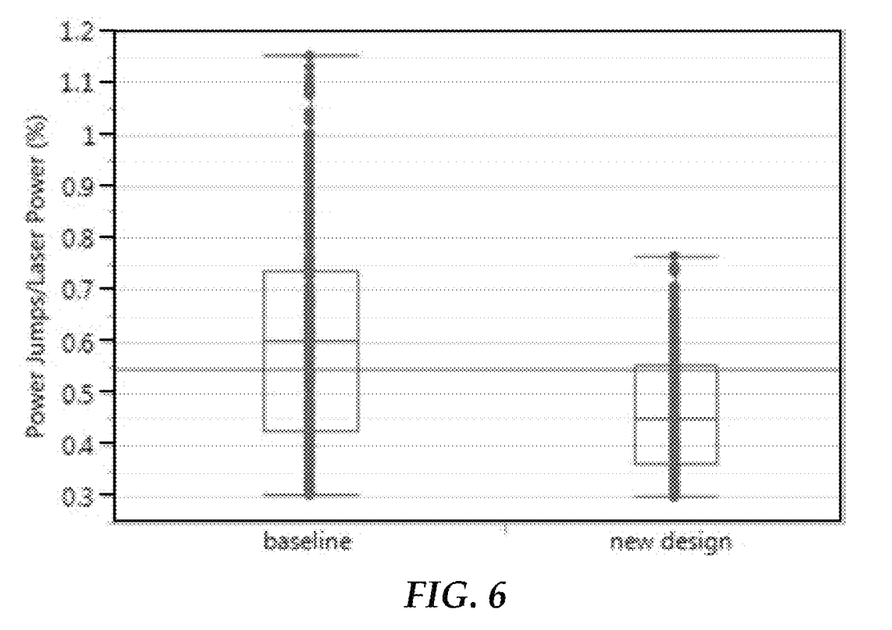

The plot in FIG. 6 shows simulation results for power jumps (mode hops) in a laser attached to the rear of the two designs. It can be seen that the size of the 90th percentile power jump is 30% smaller for the current configuration on the right compared with the baseline configuration on the left. This is due to a reduction in reflections coming back from the front-edge boundary (edge facing away from the energy source) of the input coupler. Further modelling shows that the addition of the escape slab will reduce reflections from the neck to close to zero. Without the escape slab, a 2 μm wide neck will introduce back reflections of ~0.01% of the optical power.

Figure 7:
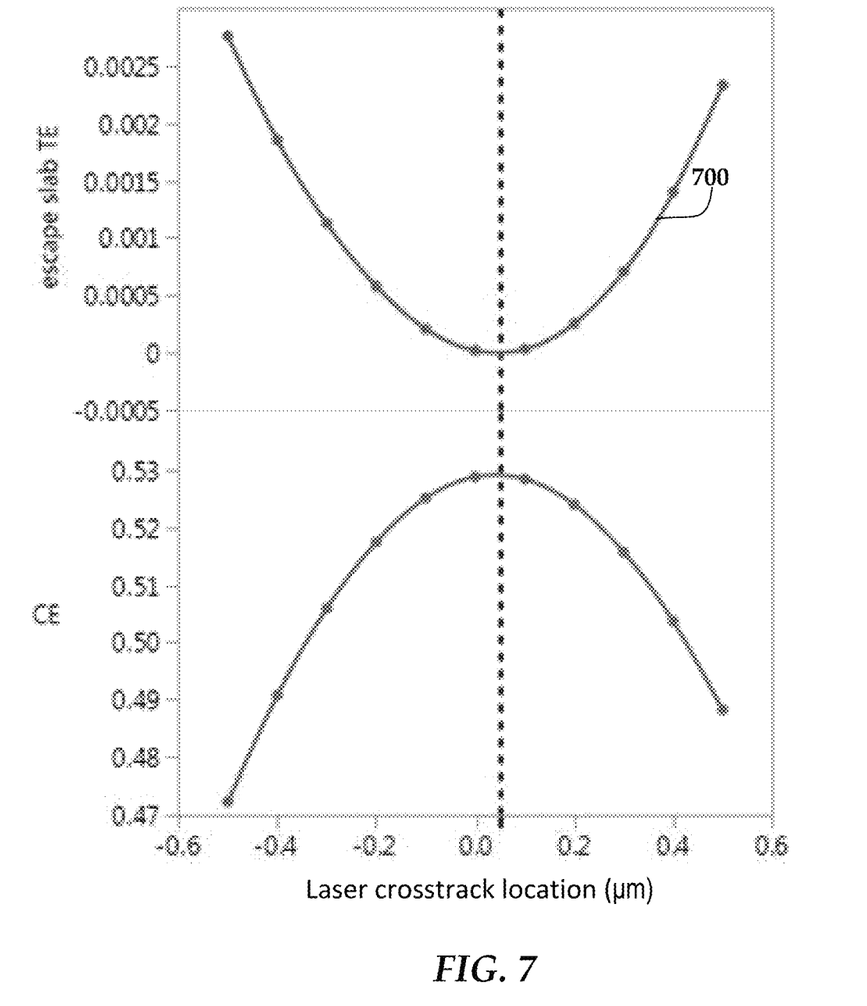

The input couplers and escape slabs described above may have additional uses instead of or in addition to reducing light reflections. For example, one challenge with HAMR designs is how to correctly align the light source on the slider body when building the recording head. In FIG. 7, a plot shows both coupling efficiency (CE) of the NFT and transverse electric (TE) mode light exiting the escape slab as a function of laser crosstrack alignment. As indicated by curve 700, the amount of TE-polarized light exiting the front of the escape slab is minimized when the laser is in the optimal crosstrack position. As a result, active alignment of the laser may be achieved by activating the laser while moving it in the crosstrack direction relative to the slider body. This causes part of the light to be coupled into the escape slab. The light exiting from the escape slab (e.g., exiting from an aperture) is monitored and used to determine optimum crosstrack alignment, e.g., where the output is a minimum value.

Figure 8:
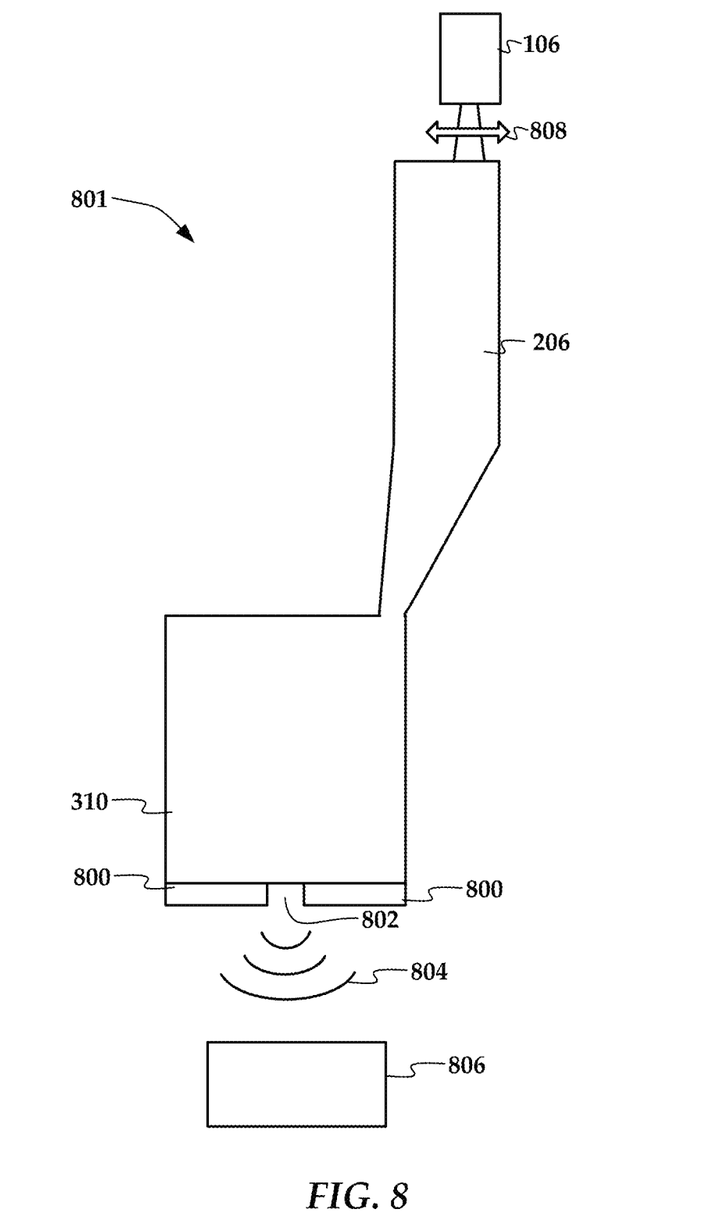
FIG. 8 is a diagram showing alignment features of a slider body according to an example embodiment.

In FIG. 8, a diagram illustrates alignment features of a slider body 801 according to an example embodiment. Generally, the slider body 801 includes an input coupler 206 and escape slab 310 as previously described. One end of the escape slab 310 (e.g., end 310a facing away from the energy source 106) is coated with an opaque material 800 (e.g., $SiO_2$) with a gap/void that forms an aperture 802. The aperture 802 may be filled with air or some other transparent material. Light 804 from the escape slab 310 exits the aperture 802 where it is detected by a sensor 806. At the same time, the energy source 106 is moved in a crosstrack direction as indicated by arrow 808.

The coating 800 and aperture 802 may be located near the air-bearing surface of the slider (e.g., media-facing surface 112 shown in FIG. 1), in which case the light 804 may be far-field light and the sensor 806 may be a far-field detector that is located external to the slider. In other embodiments, the sensor 806 may be integrated into the slider 801, such that the aperture 802 couples the light to a cavity or waveguide integrated into the slider body 801 where it is detected by the sensor 806. In such a case, the light 804 may be far-field or near-field. Note that the coating 800 and aperture 802 may be located on other parts of the escape slab 301, e.g., on a crosstrack-facing edge of the slider body, trailing edge of the slider body, etc.

Figure 9:
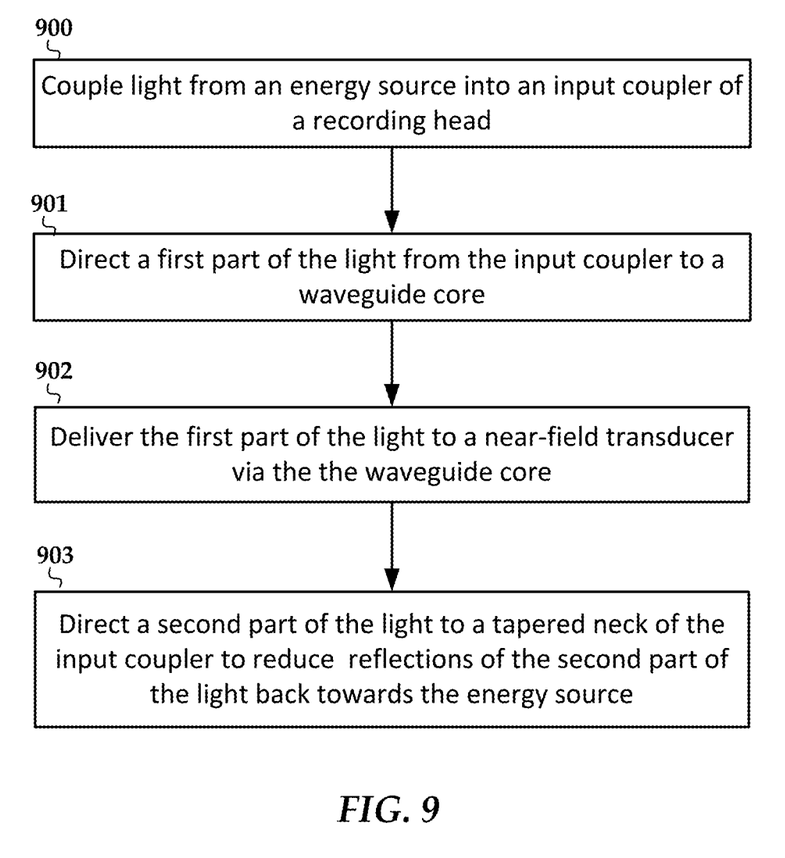
FIG. 9 is a flowchart of a method according to an example embodiment.

In FIG. 9, a flowchart shows a method according to an example embodiment. The method involves coupling 900 light from an energy source into an input coupler of a recording head. A first part of the light is directed 901 from the input coupler to a waveguide core. The waveguide core delivers 902 the first part of the light to a near-field transducer that heats a magnetic recording medium. A second part of the light is delivered 903 to a tapered neck of the input coupler. The tapered neck terminates off-center from the waveguide core in a crosstrack direction and reduces reflections of the second part of the light back towards the energy source.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
   a waveguide core comprising an input end proximate an energy source at an input surface of the recording head, the waveguide core coupling light from the energy source to a near-field transducer that heats a recording medium in response to the light; and
   an input coupler extending along the waveguide core from the input end to a termination region that is away from the input end in a light propagation direction, the input coupler comprising a first refractive index between that of the waveguide core and a surrounding material; the input coupler being wider than the waveguide core and having a slanted edge at the termination region, the slanted edge crossing the waveguide core such that the input coupler narrows to a neck away from the waveguide core in a crosstrack direction.

2. The recording head of claim 1, wherein the neck diverts stray light away from the waveguide core.

3. The recording head of claim 1, further comprising an escape slab having an edge joined with the neck of the input coupler.

4. The recording head of claim 3, wherein the escape slab dissipates light coupled from the neck of the input coupler.

5. The recording head of claim 3; wherein the escape slab comprises:
   an opaque coating on one edge of the escape slab; and
   an aperture formed within the opaque coating, the aperture allowing light to exit the escape slab.

6. The recording head of claim 5, further comprises a sensor that detects the light that exits the escape slab, the sensor used to determine alignment of the energy source with the waveguide core based on the light that exits the slab being at a minimum value.

7. The recording head of claim 1, wherein the slanted edge of the input coupler reflects stray light that is not coupled into the waveguide core away from the light source.

8. The recording head of claim 1, wherein the slanted edge is at an angle relative to a light propagation direction of the waveguide, the angle being less than 15 degrees.

9. The recording head of claim 1, wherein the input coupler comprises a second slanted edge that does not cross the waveguide core, the second slanted edge being at a different angle relative to a light propagation direction of the waveguide than the slanted edge.

10. A recording head, comprising:
    a waveguide core extending from a light source to a near-field transducer;
    an input coupler extending along the waveguide core, the input coupler having a first end at the light source and a second end with a tapered neck that terminates off-center from the waveguide core in a crosstrack direction, the second end located between the light source and the near-field transducer; and
    an escape slab joined with the neck of the input coupler, stray light from the input coupler being coupled into the escape slab via the neck.

11. The recording head of claim 10, wherein the escape slab dissipates light coupled from the neck of the input coupler.

12. The recording head of claim 10, wherein the escape slab comprises:
    an opaque coating on one edge of the escape slab; and
    an aperture formed within the opaque coating, the aperture allowing light to exit the escape slab.

13. The recording head of claim 12, further comprises a sensor that detects the light that exits the escape slab, the sensor used to determine alignment of the energy source with the waveguide core based on the light that exits the slab being at a minimum value.

14. The recording head of claim 10, wherein the neck of the input coupler comprises a slanted edge that crosses over the waveguide core; slanted edge reflecting stray light that is not coupled into the waveguide core away from the light source.

15. The recording head of claim 14, wherein the slanted edge is at an angle relative to a light propagation direction of the waveguide, the angle being less than 15 degrees.

16. The recording head of claim 14, wherein the input coupler comprises a second slanted edge that does not cross the waveguide core, the second slanted edge being at a different angle relative to a light propagation direction of the waveguide than the slanted edge.

17. A method comprising:
    coupling light from an energy source into an input coupler of a recording head;
    directing a first part of the light from the input coupler to a waveguide core, the waveguide core delivering the first part of the light to a near-field transducer that heats a magnetic recording medium; and directing a second part of the light to a tapered neck of the input coupler, the tapered neck terminating off-center from the waveguide core in a crosstrack direction and reducing reflections of the second part of the light back towards the energy source.

18. The method of claim 17, further comprising directing the second part of the light into an escape slab.

19. The method of claim 18, wherein the second part of the light is dissipated in the escape slab.

20. The method of claim 18, wherein the escape slab comprises:

an opaque coating on one edge of the escape slab; and an aperture formed within the opaque coating, the aperture allowing light to exit the escape slab, the method further comprises measuring the second part of the light via the aperture to assist in aligning the energy source with the recording head.

* * * * *